United States Patent
Murofushi et al.

[11] Patent Number: 5,166,041
[45] Date of Patent: Nov. 24, 1992

[54] NEAR INFRARED RAY-DECOLORIZABLE RECORDING MATERIAL

[75] Inventors: Katsumi Murofushi; Yoshikazu Hosoda; Yoke Ai Gan; Kunio Kondo, all of Kawasaki, Japan

[73] Assignee: Showa Denko K.K., Tokyo, Japan

[21] Appl. No.: 733,776

[22] Filed: Jul. 22, 1991

[30] Foreign Application Priority Data

Jul. 23, 1990 [JP] Japan ............................ 2-194187
Jun. 26, 1991 [JP] Japan ............................ 3-181882

[51] Int. Cl.$^5$ ............................................. G03C 1/72
[52] U.S. Cl. ............................... 430/339; 430/340; 430/926; 430/944
[58] Field of Search ............ 430/339, 340, 914, 926, 430/944, 915, 916

[56] References Cited

U.S. PATENT DOCUMENTS

| | | | |
|---|---|---|---|
| 2,221,776 | 9/1938 | Carlson | 430/48 |
| 2,297,691 | 10/1942 | Carlson | 430/55 |
| 2,618,552 | 11/1952 | Wise | 430/121 |
| 2,874,063 | 2/1959 | Greig | 430/106.6 |
| 4,751,102 | 6/1988 | Adair et al. | 427/53.1 |
| 4,902,604 | 2/1990 | Yamaguchi et al. | 430/281 |
| 5,080,994 | 1/1992 | Breton et al. | 430/137 |

FOREIGN PATENT DOCUMENTS

| | | |
|---|---|---|
| 0040977 | 12/1981 | European Pat. Off. |
| 0223587 | 5/1987 | European Pat. Off. |
| 0305054 | 3/1989 | European Pat. Off. |
| 0379157 | 7/1990 | European Pat. Off. |
| 17-23910 | 11/1942 | Japan |
| 18-24748 | 10/1943 | Japan |
| 50-75991 | 6/1975 | Japan |
| 50-105555 | 8/1975 | Japan |
| 57-130046 | 8/1982 | Japan |
| 57-191650 | 11/1982 | Japan |
| 60-155179 | 8/1985 | Japan |
| 1-229084 | 9/1989 | Japan |
| 1-271469 | 10/1989 | Japan |
| 2-22370 | 1/1990 | Japan |

OTHER PUBLICATIONS

*Patent Abstracts of Japan*, vol. 14, No. 191 (JP-A-02 037 364), Apr. 1990.

Primary Examiner—Charles L. Bowers, Jr.
Assistant Examiner—John A. McPherson
Attorney, Agent, or Firm—Sughrue, Mion, Zinn, Macpeak & Seas

[57] ABSTRACT

The present invention relates to a near infrared ray-decolorizable recording material comprising a near infrared ray-absorbing cationic dye-borate anion complex having the formula (I):

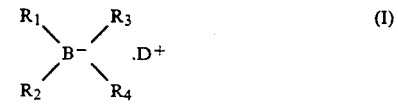

wherein $D^+$ represents a cationic dye having absorptions in the near infrared region; $R_1$, $R_2$, $R_3$, and $R_4$ independently represent an alkyl, aryl, alkaryl, allyl, aralkyl, alkenyl, alkynyl, silyl, alicyclic, or saturated or unsaturated heterocyclic group, substituted alkyl, substituted aryl, substituted alkaryl, substituted allyl, substituted aralkyl, substituted alkenyl, substituted alkynyl, or substituted silyl, with the proviso that at least one of $R_1$, $R_2$, $R_3$, and $R_4$ represents an alkyl group having 1 to 8 carbon atoms.

9 Claims, No Drawings

NEAR INFRARED RAY-DECOLORIZABLE RECORDING MATERIAL

BACKGROUND OF THE INVENTION (1) Field of the Invention

The present invention relates to a near infrared ray-decolorizable recording material capable of being decolorized with a near infrared ray, and a toner and ink containing the near infrared ray-decolorizable recording material as a colorant.

(2) Description of the Related Art

Conventionally, in the fields of, for example, printing and copying, the storability of a recording material, in terms of environmental resistance, e.g., light resistance, moisture resistance, resistance to solvent, and thermal resistance, has become increasingly important, and thus many attempts have been made to improve the physical properties of dyes and pigments. Particularly, many developments have been made in the fields of electrophotographic recording, electrostatic recording, and thermal transfer-ink recording. Recently, due to the increasing amount of information available, a repeated printing has been required, and photochromic materials and thermalchromic materials have been developed as recording materials for multiple recording systems or rewritable recording materials (see, for example, Japanese Unexamined Patent Publication (Kokai) No. 60-155179, Japanese Unexamined Patent Publication (Kokai) No. 50-75991, and Japanese Unexamined Patent Publication (Kokai) No. 50-105555.

Japanese Unexamined Patent Publication (Kokai) No. 60-155179 discloses flugide compounds which appear blue under ultraviolet rays and are transparent under a white light, and Japanese Unexamined Patent Publication (Kokai) No. 50-75991 discloses a thermally discoloring material comprising a coupler consisting mainly of a leuco-dye, and a phenolic hydroxy group-containing compound as a developer. These rewritable recording materials, however, are reversibly decolored and colored or subjected to color changes by a visible light or ultraviolet rays, and further, have problems in terms of storage stability under visible light and durability to repeated recording.

Further, many similar studies have been made in the fields of electrophotographic recording and electrostatic recording, as well as in the fields of printing inks and inks for printers, and many electrophotographic printing methods are known, for example, as disclosed in U.S. Pat. No. 2297691, Japanese Examined Patent Publication (Kokoku) No. 42-23910, and Japanese Examined Patent Publication (Kokoku) No. 43-24748. In general, an electric latent image is formed on a sensitizing material, utilizing a photoconductive substance in many ways, the latent image is developed with a toner to form a visible image, and optionally, after the toner image is transferred to a material such as paper, the image is fixed by the application of heat and pressure to obtain a copy. Furthermore, various developing processes wherein an electrostatic image is obtained by using a toner are known. For example, various developing processes, such as the magnetic brush process disclosed in U.S. Pat. No. 2874063, the cascade developing process disclosed in U.S. Pat. No. 2,618,552, the powder-cloud process disclosed in U.S. Pat. No. 2,221,776, the fur brush developing process, and the liquid developing process, etc. are known. Various magnetically recording processes wherein a magnetic latent image is formed and then developed with a magnetic toner are also known. The toner image when developed is optionally transferred to a material such as paper, and then fixed. As processes for developing the toner image, a process wherein the toner is heated and melted by a heater or heated roller, to be fused to a base material and followed by solidification, a process wherein the binder resin of the toner is softened or dissolved with an organic solvent to be fixed on a base material, and a process wherein the toner is fixed on a base material by the application of pressure are known.

The toners used in the fixing process using heating rollers as described above are generally prepared by melt mixing and uniformly dispersing a colorant such as carbon black, and additives such as an electric charge regulator, in a thermoplastic resin such as a styrene-butyl acrylate copolymer, allowing the mixture to cool, and then finely pulverizing the solidified product into a desired particle diameter by a pulverizer or dispersing machine. Furthermore, currently a coloration is under development in the printing and copying fields, and an improvement of the physical properties of colorants and electric charge regulator is widely sought (see, for example, Japanese Unexamined patent publication (Kokai) No. 57-130046 and Japanese Unexamined patent publication (Kokai) No. 57-191650).

Many printing processes, such as off-set press printing, letterpress printing, gravure printing, transfer press printing, or specific press printing inclusive of flexographic printing, metal printing, plastic printing, and glass printing, as well as electric printing by printers such as impact printers or non-impact printers in the printing field are known, and the inks used consist mainly of a vehicle, a binder, and a colorant such as a dye or pigment. Further, recently, the development of ultraviolet curing inks for preventing pollution by not using solvents, improving productivity by a rapid curing, or improving the physical properties of the cured coat have been proposed (see, for example, Japanese Unexamined patent publication No. 1-229084, Japanese Unexamined patent publication (Kokai) No. 1-271469, and Japanese Unexamined patent publication (Kokai) No. 2-22370).

Nevertheless, thermal color-changing materials such as the photochromic material and leuco-dye as described above have a poor image stability under visible light. Furthermore, the above-mentioned toners for electrophotographic recording and printing inks have problems in that, after being set, the set image cannot be decolorized, the recording portion cannot be set again, and the recording paper can not be reused, and further, a problem arises in terms of keeping the accompanying disposal treatment content of disposed papers secret.

SUMMARY OF THE INVENTION

An object of the present invention is to provide a recording material having a sensitivity to light in the near infrared region, to stabilize the recorded portion, capable of decolorizing the set and printed recording material with near infrared rays and of recording on the same portion again, and stable under visible light.

To solve the above problems, investigations were made into a specific near infrared ray-absorbing cationic dye-borate anion complex, and as a result, it was found that a near infrared ray decolorizable recording material, which is decolorized with near infrared rays, can be obtained, and thus the present invention was achieved.

In accordance with the present invention, there is provided a near infrared ray-decolorizable recording material comprising a near infrared ray-absorbing cationic dye-borate anion complex having the formula (I):

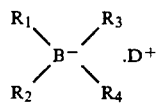

wherein $D^+$ represents a cationic dye having absorptions in the near infrared region; $R_1$, $R_2$, $R_3$, and $R_4$ independently represent an alkyl, aryl, alkaryl, allyl, aralkyl, alkenyl, alkynyl, silyl, alicyclic, or saturated or unsaturated heterocyclic group, substituted alkyl, substituted aryl, substituted alkaryl, substituted allyl, substituted aralkyl, substituted alkenyl, substituted alkynyl, or substituted silyl, with the proviso that at least one of $R_1$, $R_2$, $R_3$, and $R_4$ represents an alkyl group having 1 to 8 carbon atoms, having absorptions in the near infrared region, which is decomposed and decolorized by an irradiation of near infrared rays having a wavelength of 700 nm or more, and which is stable under visible light.

DESCRIPTION OF THE PREFERRED EMBODIMENTS

The near infrared ray-decolorizable recording material according to the present invention can provide a light decolorizable composition sensitive to near infrared rays, which can be decolorized by irradiating light having this wavelength region, by incorporating it into a base material such as a wax or resin.

The specific types of cationic dyes which compose the near infrared ray-absorbing cationic dye-borate anion complex used in the present invention are cyanine, triarylmethane, aminium, and diimonium dyestuffs which have absorptions in the near infrared region. $R_1$, $R_2$, $R_3$, and $R_4$ in the borate anion independently represent an alkyl, aryl, aklaryl, allyl, aralkyl, alkenyl, alkynyl, silyl, alicyclic, or saturated or unsaturated heterocyclic group, substituted alkyl, substituted aryl, substituted alkaryl, substituted allyl, substituted aralkyl, substituted alkenyl, substituted alkynyl, or substituted silyl, with the proviso that at least one of $R_1$, $R_2$, $R_3$, and $R_4$ represent an alkyl group having 1 to 8 carbon atoms. Examples of the substituents for the above-mentioned substituted groups are methyl, ethyl, n-propyl, n-butyl, n-hexyl, n-octyl, cyclohexyl, cyclohexenyl, methoxy methyl, methoxyethyl, dimethylaminoethyl, phenyl, anisyl, ethoxy phenyl, methyl phenyl, tert-butyl phenyl, fluorophenyl, chlorophenyl, dimethylaminophenyl, diethylaminophenyl, vinyl, allyl, triphenylsilyl, dimethylphenylsilyl, dibuthylphenylsilyl, trimethylsibyl, piperidyl, thienyl, furyl, pyrrolyl, etc.

Examples of the complexes especially available in the present invention are shown in Table 1.

TABLE 1

| Complex No. | Structure | R | Ar | λ max (TMPT) |
|---|---|---|---|---|
| 1 | (quinoline cyanine dye) Ph₃B⁻·n-C₄H₉ | | | 820 nm |
| 2 | (triarylmethane dye with (C₂H₅)₂N groups) Ph₃B⁻·n-C₄H₉ | | | 830 nm |
| 3-A | (triarylmethane dye with (CH₃CH₂)₂N groups) Ar₃B⁻·R | n-butyl | phenyl | 822 nm |
| 3-B | | n-hexyl | anisyl | 822 nm |
| 3-C | | n-octyl | phenyl | 822 nm |
| 4 | (benzothiazole cyanine dye) Ph₃B⁻·n-C₄H₉ | | | 768 nm |

TABLE 1-continued

| Complex No. | Structure | R | Ar | λ max (TMPT) |
|---|---|---|---|---|
| 5-A | (indoline dimer structure, Ar₃B⁻·R) | n-butyl | phenyl | 748 nm |
| 5-B | | n-hexyl | anisyl | 748 nm |
| 5-C | | n-octyl | phenyl | 748 nm |
| 6-A | (benz[e]indoline dimer structure, Ar₃B⁻·R) | n-butyl | phenyl | 785 nm |
| 6-B | | n-hexyl | anisyl | 785 nm |
| 6-C | | n-octyl | phenyl | 785 nm |
| 7-A | (naphthothiazole/cyclopentene structure, Ar₃B⁻·R) | n-butyl | phenyl | 828 nm |
| 7-B | | n-hexyl | anisyl | 828 nm |
| 7-C | | n-octyl | phenyl | 828 nm |
| 8 | (indoline/chlorocyclohexene structure, Ph₃B⁻·n-C₄H₉) | | | 787 nm |
| 9 | (chlorobenzothiazole/cyclopentene structure, Ph₃B⁻·n-C₄H₉) | | | 819 nm |
| 10 | (bis-thiopyrylium/chlorocyclohexene structure, Ph₃B⁻·n-C₄H₉) | | | 1080 nm |

Note
λ: absorption wavelength
TMPT: trimethylolpropane trimethacrylate
Ph: phenyl group The waxes among the base materials usable in the present invention are those generally used in thermal transferring sheets and inks, including, for example, carbana wax and Japan wax, which are vegetable waxes; beeswax and wool grease, which are animal waxes; paraffin wax and microcrystalline wax, which are mineral waxes; and polyethylene waxes, PTTE, chlorinated paraffin, and fatty acid amides, which are synthetic waxes.

The resins usable in the present invention are all conventional resins, and include, for example, normal temperature drying and curing resins for coating, moisture curing resins for coating, and thermal curing resins for coating, etc., which are capable of brushing, spray coating, dip coating, gravure coating, doctor coating, roll coating, electrostatic coating, powder coating, transferring, and printing, etc. Concrete examples include oil varnish, boiled oil, shellac, cellulose resins, phenol resins, alkyd resins, amino resins, xylene resins, toluene resins, vinyl chloride resins, vinylidene chloride resins, vinyl acetate resins, polystyrene resins, vinyl-butyral resins, acrylic resins, methacrylic resins, diallyl phthalate resins, epoxy resins, urethane resins, polyester resins, polyether resins, aniline resins, furan resins, polyimide resins, silicone resins, and fluoroplastics. Furthermore, the resins may be photo- and electron beam-curing resins, concrete examples including macromonomers, oligomers, and monomers of polyvinyl cinnamate resins, polyvinylbenzal-acetophenone resins, polyvinylstylyl pyridine resins, polyvinyl anthral resins, unsaturated polyester resins, acrylated oils, acrylated alkyd resins, acrylated polyester resins, acrylated polyether resins, acrylated epoxy resins, acrylated polyurethane resins, acrylic resins, acrylated spirane resins, acrylated silicone resins, acrylated fluoroplastics, polythiol resins, and cationically polymerizable epoxy resins. Still further, the base materials may be photo- and chemical-polymerizable monomers and oligomers, and more specifically ethylenically unsaturated compounds. Concrete examples include acrylic or methacrylic esters of monohydric or polyhydric alcohols, and 4-(meth)acryloxyl group-containing aromatic polycarboxylic acids and anhydrides thereof. These can be used alone or as a combination of two or more thereof. Where the monomer is used as the base material, no influence is felt even if the near infrared ray-decolorizable recording material is dissolved in the monomer and the mixture then chemically polymerized or photo-polymerized. The base material according to the present invention is not limited thereto, and all materials are applicable as long as they can be mixed with the near infrared ray-decolorizable recording material by dissolving or dispersing.

The near infrared ray-decolorizable recording material of the present invention can be formed by dissolving with a solvent or by melting and mixing with the base material in a ratio of 0.01 to 90% by weight, particularly 0.1 to 50% by weight. Note, the near infrared ray-decolorizable recording material of the present invention can give a desired effect even when the near infrared ray-decolorizable recording material itself is dissolved in a solvent and then coated or set.

The decolorization of the near infrared ray-decolorizable recording material of the present invention can be further promoted by adding the quarternary ammonium-borate complex having the formula (II) as a sensitizer:

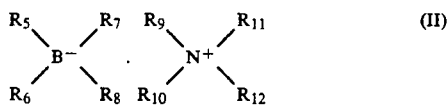

wherein $R_5$, $R_6$, $R_7$, and $R_8$ independently represent an alkyl, aryl, allyl, alkaryl, aralkyl, alkenyl, alkynyl, silyl, alicyclic, or saturated or unsaturated heterocyclic group, substituted alkyl, substituted aryl, substituted alkaryl, substituted allyl, substituted aralkyl, substituted alkenyl, substituted alkynyl, or substituted silyl, with the proviso that at least one of $R_5$, $R_6$, $R_7$, and $R_8$ represents an alkyl group having 1 to 8 carbon atoms; and $R_9$, $R_{10}$, $R_{11}$, and $R_{12}$ independently represent hydrogen, an alkyl, aryl, alkaryl, allyl, aralkyl, alkenyl, alkynyl, or saturated or unsaturated heterocyclic group, substituted alkyl, substitutied aryl, substituted alkaryl, substituted allyl, substituted aralkyl, substituted alkenyl, or substituted alkynyl. Examples of the substituent groups are methyl, ethyl, n-propyl, n-butyl, n-hexyl, cyclohexyl, cyclohexernyl, methoxymethyl, methoxyethyl, dimethylaminoethyl, phenyl, anisyl, ethoxyphenyl, methylphenyl, tert-butylphenyl, fluorophenyl, chlorophenyl, dimethylaminophenyl, diethylaminophenyl, vinyl, allyl, triphenylsilyl, dimethylphenylsilyl, dibutylphenylsilyl, trimethylsilyl, hydrogen, piperidyl, thienyl, furyl, pyrrolyl, etc.

Typical examples include tetramethylammonimum n-butyltriphenyl borate, tetramethylammonimum n-butyltrianisyl borate, tetramethylammonimum n-octyltriphenyl borate, tetramethylammonimum n-octyltrianisyl borate, tetraethylammonimum n-butyltriphenyl borate, tetraethylammonimum n-butyltrianisyl borate, trimethylhydrogenammonimum n-butyltriphenyl borate, triethylhydrogenammonimum n-butyltriphenyl borate, tetrahydrogenammonimum n-butyltriphenyl borate, tetramethylammonimum tetrabutyl borate, tetraethylammonimum tetrabutyl borate, tetramethylammonimum tri-n-butyl(triphenylsilyl) borate, tetraethylammonimum tri-n-butyl (triphenylsilyl) borate, tetrabutylammonimum tri-n-butyl(triphenylsilyl) borate, tetramethylammonimum tri-n-butyl(dimethylphenylsilyl) borate, tetraethylammonimum tri-n-butyl(dimethylphenylsilyl) borate, tetrabutylammonimum tri-n-butyl (dimethylphenylsilyl) borate, tetramethylammonimum n-octyldiphenyl(di-n-butylphenylsilyl) borate, tetraethylammonimum n-octyldiphenyl(di-n-butylphenylsilyl) borate, tetrabutylammonimum n-octyldiphenyl(di-n-butylphenylsilyl) borate, tetramethylammonium dimethylphenyl(trimethylsilyl) borate, tetraethylammonium dimethylphenyl(trimethylsilyl) borate, and tetrabutylammonium dimethylphenyl(trimethylsilyl) borate, etc. Furthermore, general dyes and pigments for coloration may be added. In this case, the color of the dye or pigment may remain after the near infrared ray-decolorizable recording material is decolorized by irradiating a near infrared ray.

The near infrared ray-decolorizable recording material of the present invention can be used alone or as a combination of a plurality of near infrared ray-decolorizable recording materials.

The near infrared ray-decolorizable recording material of the present invention is mixed with the base material as described above, and set or printed on paper, plastic or metal, after which the set or printed portion can be decolorized by irradiation of near infrared rays by a semiconductor laser, a halogen lamp, or a luminescent semiconductor diode. The decolorized portion can be set or repeatedly printed.

The near infrared ray-decolorizable recording material of the present invention can be used as a toner for electrophotographic recording or electrostatic recording or a colorant for a printing ink and an ink for a sublimating or melting transfer printer, and further, can be used for stationary and writing materials such as an ink for a serial printer, an ink for an ink jet printer, a ballpoint pen, a marker, and a magic marker, and a colorant for an UV curing ink and a paint. Note the applications of the near infrared ray-decolorizable recording material is not limited to these examples.

The concrete uses thereof will now be explained.

The decolorizable toner for the electrophotograph of the present invention is prepared by melting or mixing or dispersing with a solvent, and kneading the near infrared ray-decolorizable recording material, a sensitizer and a electric charge regulator, and if needed, fillers such as titanium white and calcium carbonate as other additives, in a base material such as a binder resin for toner. The storage stability can be further improved when an ultraviolet absorbing agent is added.

Either a positive or negative electric charge regulator hitherto used as a color toner may be used as the electric charge regulator. Examples of positive electric charge regulators are quarternary ammonium salts, alkylamides, hydrophobic silica, etc., and examples of negative electric charge regulators are diaminoanthraquinone, chlorinated polyolefins, chlorinated polyesters, metal salts of naphthenic acid, metal salts of fatty acids, etc.

White fillers such as titanium white, talc, kaolin, silica, alumina, calcium carbonate, aluminum sulfate, barium sulfate, calcium sulfate, titanium oxide, and calcium phosphate can be used as the fillers. The addition of the filler makes it possible to adjust the whiteness after decolorization. The conventional ultraviolet absorbing agent may be used as the ultraviolet absorbing agent.

As the binder resins for the toner of the present invention, thermoplastic resins such as polystyrene resins, acrylic resins, and styrene-(meth)acrylate copolymers are used. Examples of the polystyrene resins include polystyrene homopolymers, hydrogenated polystyrene, styrene-propylene copolymers, styrene-isobutylene copolymers, styrene-butadiene copolymers, styrene-allyl alcohol copolymers, styrene-maleate copolymers, styrene-maleic anhydride copolymers, acrylonitrile-butadiene-styrene terpolymers, acrylonitrile-styrene-acrylate terpolymers, styrene-acrylonitrile copolymers, acrylonitrile-acrylic rubber-styrene terpolymers, acrylonitrile-chlorinated polyethylene-styrene terpolymers, etc. Examples of the acrylic resins include polymethyl methacrylate, ethyl methacrylate, butyl methacrylate, glycidyl methacrylate, fluorine-containing acrylate, methylene methacrylate-butyl methacrylate copolymers, ethyl acrylate-acrylic acid copolymer, etc. Examples of the styrene-(meth)acrylate copolymers include styrene-acrylic acid copolymers, styrene-butadiene-acrylate terpolymers, styrene-methyl methacrylate copolymers, styrene-butyl methacrylate copolymers, styrene-diethylaminoethyl methacrylate copolymers, styrene-methyl methacrylate-butyl acrylate terpolymers, styrene-glycidyl methacrylate copolymers, styrene-butadiene-dimethylaminoethyl methacrylate terpolymers, styrene-acrylate-maleate terpolymers, styrene-butyl acrylate-acrylic acid terpolymers, etc.

To improve the compatibility of the toner binder with the near infrared ray-decolorizable recording material or the quarternary ammonium-borate complex sensitizer, and the decolorization speed, it is possible to use a plasticizer generally used for modifying a resin, or a sensitizer or wax used in a thermal sensitive recording paper. Concrete examples include dibutyl phthalate, dioctyl phthalate, dimethyl terephthalate, diethyl terephthalate, dibutyl terephthalate, dioctyl adipate, dioctyl azelate, trioctyl citrate, tributyl acetylcitrate, dibutyl sebacate, dioctyl sebacate, methyl stearate, ethyl stearate, butyl stearate, methyl esters of hydrogenated rosins, chlorinated paraffin etc.

The near infrared ray-decolorizable recording material, which is a colorant for the decolorizable toner, may be mixed with the above-mentioned toner binder by using a solvent in a ratio of 0.01 to 90% by weight, preferably 0.5 to 20% by weight. The addition of the quarternary ammonium-borate complex sensitizer in an amount of 0.01 to 10% by weight, preferably 0.1 to 5% by weight, based on one percent by weight of the near infrared ray-decolorizable recording material, enhances the decolorization speed.

The electric charge regulator can be added in an amount sufficient to adjust the electric charge amount of toner to the range of 5 to 30 $\mu c/g$., and may be added in an amount of 1 to 10% by weight based on the toner binder.

The filler can be added in an amount of 1 to 20% by weight based on the toner binder, preferably in an amount of 1 to 5% by weight. The ultraviolet absorbing agent may be added in an amount of 1 to 20% by weight, based on the weight of the toner binder.

The processes for preparing the decolorizable toner include a solution process and a melting process. In the solution process, the near infrared ray-decolorizable recording material of the present invention is dissolved and kneaded in the binder for a toner with an organic solvent, and if required, the quarternary ammonium-borate complex sensitizer, the electric charge regulator, the ultraviolet absorbing agent, etc. are added, dissolved, and kneaded, and if added, the fillers are dispersed by a paint conditioner, to prepare a mixed resin. After the organic solvent is removed from the mixed resin thus obtained, the toner is prepared by coarsely pulverizing the mixed resin by a hammer mill or a cutter mill, followed by a fine pulverization by a jet mill. In the melting process, the near infrared ray-decolorizable recording material of the present invention is melt kneaded in the toner binder, and if required, the quarternary ammonium-borate complex sensitizer, electric charge regulator, ultraviolet absorbing agent and fillers are melt kneaded to prepare a mixed resin. The resulting mixed resin is pulverized in the same manner as for the solvent process, to prepare a toner. The decolorizable toner obtained as described above can be used not only as a one-component type but also as a two-component type.

After the decolorizable toner is set or printed on paper or an OHP film and then fixed, the set portion can be decolorized by irradiating near infrared rays by using a semiconductor laser, a halogen lamp, or a luminescent semiconductor diode. Furthermore, the decolorized portion can be repeatedly set.

The decolorizable printing ink of the present invention is prepared by mixing and kneading the near infrared ray-decolorizable recording material as a colorant, and the sensitizer with a vehicle for fixing same on the surface to be printed, and as required, is prepared by dispersing and kneading fillers such as titanium white and calcium carbonate as other additives. The storage stability can be further improved when a ultraviolet absorbing agent is added.

The vehicle used in this decolorizable printing ink comprises a drying oil which is relatively rapidly dried when left standing in air, a resin for improving the drying characteristics, gloss, transition characteristics, etc., and a solvent which imparts the required viscosity and fluidity. Also, as necessary, a plasticizer can be added for imparting a pliability and flexibility to a dried coat of the ink.

The drying oils include linseed oil, china wood oil, soybean oil, castor oil, etc.

The resins include natural resins such as rosin and shellac; natural resin derivatives such as cured rosin, rosin esters, maleic acid resins and fumaric acid resins; synthetic resins such as phenol resins, xylene resins, urea-melamine resins, ketone resins, polyvinyl chloride resins, vinyl chloride-vinyl acetate copolymerized resins, butyral resins, styrene-maleic acid resins, chlorinated polypropylene, acrylic resins, polyester resins, alkyd resins, polyamide resins, epoxy resins, polyurethane, and nitrocellulose.

The solvents include aliphatic hydrocarbons such as hexane, heptane and rubber solvents; aromatic hydrocarbons such as toluene and xylene; alcohols such as methyl alcohol, ethyl alcohol, propyl alcohol, isopropyl alcohol, butyl alcohols and cyclohexyl alcohol; glycols such as diethylene glycol, dipropylene glycol, triethylene glycol, polyethylene glycols, propylene glycol, dipropylene glycol and glycerine; glycol derivatives such as ethylene glycol monomethyl ether, ethylene glycol monoethyl ether, ethylene glycol monobutyl ether, diethylene glycol monoethyl ether, diethylene glycol monobutyl ether, ethylene glycol monoethyl ether acetate, ethylene glycol monobutyl ether acetate, diethylene glycol monoethyl ether acetate and diethylene glycol monobutyl ether acetate; esters such as ethyl acetate, isopropyl acetate and butyl acetate; and ketones such as acetone, methyl ethyl ketone, methyl isobutyl ketone and cyclohexanone. As the plasticizers, those mentioned in the above-mentioned decolorizable toner for electrophotographs can be used.

Fillers similar to those of the above-mentioned decolorizable toner for electrophotographs may be used, and conventional ultraviolet absorbing agents may be used as the ultraviolet absorbing agent.

To improve the decolorizing speed, a plasticizer which can be used for modifying a resin, as in the case of the decolorizable toner, or a sensitizer and wax which are used in a thermal recording paper can be used.

The near infrared ray-decolorizable recording material, which is a colorant for the decolorizable printing ink, may be mixed with the above-mentioned vehicle in a ratio of 0.01 to 90% by weight, preferably at a ratio of 0.5 to 20% by weight. The addition of the quarternary ammonium-borate complex sensitizer in an amount of 0.01 to 10% by weight, preferably 0.1 to 5% by weight, based on one percent by weight of the near infrared ray-decolorizable recording material, enhances the decolorization speed. The resin may be mixed so as to meet the requirement of the printing operation.

The fillers also may be added in an amount of 1 to 20% by weight, preferably 1 to 5% by weight. The ultraviolet absorbing agent may be added in an amount of 1 to 20% by weight based on the weight of the drying oil.

This decolorizable printing ink can be prepared by kneading the near infrared ray-decolorizable recording material of the present invention with the drying oil, and if required, adding and kneading the quarternary ammonium-borate complex sensitizer, ultraviolet absorbing agent, fillers, etc.

After being printed by any of various printing processes, such as off-set press printing, letterpress printing, gravure press printing transfer press printing, or a specific press printing inclusive of flexographic printing, metal printing, plastic printing, and glass printing, as well as electric printing by printers such as an impact printers or non-impact printers, this decolorizable printing ink can be decolorized by irradiating near infrared rays by a semiconductor laser, a halogen lamp, or a luminescent semiconductor diode. Further, the decolorized portion can be repeatedly printed.

As an example of the application of a thermal melt-transfer sheet, a transfer film comprising the near infrared ray-decolorizable recording material kneaded with a paraffin wax as a binder and a xylene resin as a flexibilizer coated on a PET film is brought into close contact with a recording paper, and transferred and printed by a heated head. This set portion can be decolorized by irradiating near infrared rays.

According to the present invention, a near infrared ray-decolorizable recording material, decolorizable toner and a decolorizable ink, which can be decolorized with near infrared rays after being set and printed, which can be repeatedly printing on the same portion, and which is stable under visible light, is provided.

The present invention will now be described with reference to the following Examples, which in no way limit the scope of the present invention.

EXAMPLE 1

A 20 parts by weight amount of polymethyl methacrylate were dissolved in 78 parts by weight of methyl ethyl ketone, and the near infrared ray-decolorizable recording material listed in Table 2 was dissolved and mixed therein, in the amount shown in Table 2, to obtain a composition.

EXAMPLE 2

A 20 parts by weight amount of polymethyl methacrylate were dissolved in 76 parts by weight of methyl ethyl ketone, and the near infrared ray-decolorizable recording material and the sensitizer shown in Table 2 were dissolved and mixed therein, in the amount shown in Table 2, to obtain a composition.

EXAMPLE 3

A 20 parts by weight amount of polystyrene were dissolved in 75 parts by weight of toluene, and the near infrared ray-decolorizable recording material shown in Table 2 was dissolved and mixed therein, in the amount shown in Table 2, to obtain a composition.

EXAMPLE 4

A 20 parts by weight amount of polystyrene were dissolved in 70 parts by weight of toluene, and the near infrared ray-decolorizable recording material and the sensitizer shown in Table 2 were dissolved and mixed therein, in the amounts shown in Table 2, to obtain a composition.

EXAMPLE 5

A 20 parts by weight amount of polymethyl methacrylate were dissolved in 76 parts by weight of methyl ethyl ketone, and near infrared ray-decolorizable recording material shown in Table 2 in the amount shown in Table 2 and 2 parts by weight of SO red 1 (supplied by Orient Kagaku Kogyo) were dissolved and mixed therein, to obtain a composition.

EXAMPLE 6

A 20 parts by weight amount of polymethyl methacrylate were dissolved in 74 parts by weight of methyl ethyl ketone, and near infrared ray-decolorizable recording material shown in Table 2 in the amount shown in Table and 2 parts by weight of Oil Yellow (supplied by Orient Kagaku Kogyo), were dissolved and mixed therein, to obtain a composition.

EXAMPLE 7

In 80 parts by weight of paraffin wax (melting point: 69° C.) was thermally melted the near infrared ray-decolorizable recording material shown in Table 2 in the amount shown in Table 2, at 80° C. to obtain a composition.

EXAMPLE 8

In 70 parts by weight of paraffin wax (melting point: 69° C.) were thermally melted the near infrared ray-decolorizable recording material and the sensitizer shown in Table 2 in the amount shown in Table 2, at 80° C. to obtain a composition.

EXAMPLE 9

In 60 parts by weight of trimethylolpropane triacrylate was dissolved and mixed the near infrared ray-decolorizable recording material shown in Table 2 in the amount shown in Table 2, and 10 parts by weight of methyl o-benzylbenzoate and 5 parts by weight of triethanol amine were added, to obtain a composition.

EXAMPLE 10

In 45 parts by weight of trimethylolpropane triacrylate were dissolved and mixed the near infrared ray-decolorizable recording material and the sensitizer shown in Table 2 in the amount shown in Table 2, and further 10 parts by weight of methyl o-benzylbenzoate and 5 parts by weight of triethanol amine were added, to obtain a composition.

EXAMPLES 11 AND 12

In 98 parts by weight of hydrogenated polystyrene (softening point: 101° C.) was dissolved and kneaded near infrared ray-decolorizable recording material shown in Table 2 in the amount shown in Table 2 using methylene chloride, after which methylene chloride was removed. The resulting mixed resin was coarsely pulverized with a hammer mill or a cutter mill, and then finely pulverized with a jet mill to prepare a toner.

EXAMPLES 13 TO 17

In 96 parts by weight of styrene-butyl methacrylate copolymer (softening point: 72° C.) were dissolved and kneaded the near infrared ray-decolorizable recording material and the sensitizer shown in Table 2 in the amount shown in Table 2 using methylene chloride, after which methylene chloride was removed. The resulting mixed resin was coarsely pulverized with a hammer mill or a cutter mill, and then finely pulverized with a jet mill to prepare a toner.

EXAMPLES 18 TO 20

In 94 parts by weight of styrene-butyl methacrylate copolymer (softening point: 72° C.) were dissolved and kneaded the near infrared ray-decolorizable recording material, the sensitizer and the electric charge regulator shown in Table 2 in the amount shown in Table 2 using methylene chloride, after which methylene chloride was removed. The resulting mixed resin was coarsely pulverized with a hammer mill or a cutter mill, and then finely pulverized with a jet mill to prepare a toner.

EXAMPLES 21 TO 23

In 89 parts by weight of styrene-butyl methacrylate copolymer (softening point: 72° C.) were dissolved and kneaded the near infrared ray-decolorizable recording material, the sensitizer, the electric charge regulator and the plasticizer shown in Table 2 in the amount shown in Table 2 using methylene chloride, after which methylene chloride was removed. The resulting mixed resin was coarsely pulverized with a hammer mill or a cutter mill, and then finely pulverized with a jet mill to prepare a toner.

EXAMPLES 24 AND 25

In 94 parts by weight of styrene-butyl methacrylate copolymer (softening point: 72° C.) were dissolved and kneaded the near infrared ray-decolorizable recording material, the sensitizer and the electric charge regulator shown in Table 2 in the amount shown in Table 2 using methylene chloride, after which methylene chloride was removed. The resulting mixed resin was coarsely pulverized with a hammer mill or a cutter mill, and then finely pulverized with a jet mill to prepare a toner.

EXAMPLES 26 AND 27

In 91 parts by weight of polymethyl methacrylate (softening point: 78° C.) were dissolved and kneaded the near infrared ray-decolorizable recording material, the sensitizer, and the electric charge regulator shown in Table 2 in the amount shown in Table 2 and a methylene chloride dispersion containing 3 parts by weight of titanium white as an additive, after which methylene chloride was removed. The resulting mixed resin was coarsely pulverized with a hammer mill or a cutter mill, and then finely pulverized with a jet mill to prepare a toner.

EXAMPLE 28

In 89 parts by weight of polymethyl methacrylate (softening point: 78° C.) were dissolved and kneaded the near infrared ray-decolorizable recording material, the sensitizer and the electric charge regulator shown in Table 2 in the amount shown in Table 2 and a methylene chloride dispersion containing 2 parts by weight of a ultraviolet absorbing agent (supplied by Sumitomo Chemical Industries, SUMISORB 400) and 3 parts by weight of titanium white as additives, after which methylene chloride was removed. The resulting mixed resin was coarsely pulverized with a hammer mill or a cutter mill, and then finely pulverized with a jet mill to prepare a toner.

EXAMPLES 29 AND 30

In 60 parts by weight of linseed oil and 30 parts by weight of styrene-maleic acid resin (softening point: 70° C.) was dissolved and kneaded the near infrared ray-decolorizable recording material shown in Table 2, in the amount shown in Table 2, to prepare an ink.

EXAMPLES 31 TO 35

In 50 parts by weight of linseed oil and 30 parts by weight of styrene maleic acid resin (softening point: 70° C.) were dissolved and kneaded the near infrared ray-decolorizable recording material and the sensitizer shown in Table 2, in the amount shown in Table 2, to prepare an ink.

EXAMPLES 36 TO 38

In 40 parts by weight of soybean oil and 30 parts by weight of acrylic resin (softening point: 65° C.) was kneaded the near infrared ray-decolorizable recording material, the sensitizer, and the solvent shown in Table 2, in the amount shown in Table 2, to prepare an ink.

EXAMPLES 39 TO 41

In 40 parts by weight of soybean oil and 25 parts by weight of acrylic resin (softening point: 65° C.) were kneaded the near infrared ray-decolorizable recording material, the sensitizer, the solvent and the plasticizer shown in Table 2, in the amount shown in Table 2, to prepare an ink.

Method to Evaluating Decolorizing Properties

Concerning the compositions of Examples 1 to 6, 0.5 g of these compositions were drawn down on a Carton paper by using an RI tester, to obtain samples. The compositions of Examples 7 and 8 were coated on a polyethyleneterephthalate film having a thickness of 3.5 microns by a wire bar, to attain a membrane thickness of 4 microns. The sheets were transferred and set on a recording paper by a thermal printer at an applied energy of 2.0 mj/dot, to obtain samples. Concerning the compositions of Examples 9 and 10, 0.5 g thereof were drawn down on a Carton paper by using an RI tester, and cured by irradiation of a ultraviolet ray for 1 minute, by an 80 W/cm metal halide lamp at a distance of 8 cm.

The toners obtained in Examples 11 to 28 were further subjected to a surface treatment with a hydrophobic silica and then a carrier was mixed thereto, after which they were set on a PPC paper by a copy machine for PPC (Model LCS-24 supplied from Casio), to obtain samples.

The inks obtained in Examples 29 to 41 were drawn down on a Carton paper in amount of 5 g by using an RI tester, to obtain samples.

By irradiating near infrared rays generated from an aluminum coat type halogen lamp (2 W/cm$^2$) on the samples, for one minute, the decolorization was evaluated. The results of the evaluation are shown in Table 3.

Method of Evaluation of Resistance to Visible Light

Samples were made in the same manner as for the method of evaluating the decolorizing properties. The samples were irradiated by a dichroic coat type halogen lamp (2 W/cm$^2$) using an infrared cut filter, for 1 hour, to evaluate the decolorization.

TABLE 2

| | Near Infrared-Ray Decolorizable Recording Material (Complex No. in Table 1) and Other Additives | Amount (% by weight) |
|---|---|---|
| Example 1 | Complex 3A | 2 |
| Example 2 | Complex 3A | 2 |
| | Sensitizer (TBAPB) | 2 |
| Example 3 | Complex 5B | 5 |
| Example 4 | Complex 5B | 5 |
| | Sensitizer (TMAPB) | 5 |
| Example 5 | Complex 7C | 2 |
| Example 6 | Complex 7C | 2 |
| | Sensitizer (TBABB) | 2 |
| Example 7 | Complex 3A | 20 |
| Example 8 | Complex 3A | 20 |
| | Sensitizer (TBAPB) | 10 |
| Example 9 | Complex 9 | 30 |
| Example 10 | Complex 9 | 30 |
| | Sensitizer (TBAPB) | 15 |
| Example 11 | Complex 2 | 2 |
| Example 12 | Complex 3C | 2 |
| Example 13 | Complex 3A | 0.5 |
| | Sensitizer (TBAPB) | 2 |
| Example 14 | Complex 3A | 2 |
| | Sensitizer (TBAPB) | 2 |
| Example 15 | Complex 3A | 5 |
| | Sensitizer (TBAPB) | 2 |
| Example 16 | Complex 3C | 2 |
| | Sensitizer (TMAPB) | 2 |
| Example 17 | Complex 6B | 2 |
| | Sensitizer (TBABB) | 2 |
| Example 18 | Complex 3A | 2 |
| | Sensitizer (TBAPB) | 2 |
| | Electric charge regulator (Kayacharge N1 supplied from Nippon Kayaku) | 2 |
| Example 19 | Complex 6A | 2 |
| | Sensitizer (TBABB) | 2 |
| | Electric charge regulator (Kayacharge N1 supplied from Nippon Kayaku) | 2 |
| Example 20 | Complex 7A | 2 |
| | Sensitizer (TMHPB) | 2 |
| | Electric charge regulator (Bontron E 89 supplied from Orient Kagaku Kogyo) | 2 |
| Example 21 | Complex 3A | 2 |
| | Sensitizer (TBAPB) | 2 |
| | Electric charge regulator (Bontron E 89 supplied from Orient Kagaku Kogyo) | 2 |
| | Plasticizer (Dibutyl phthalate) | 5 |
| Example 22 | Complex 7A | 2 |
| | Sensitizer (TBAPB) | 2 |
| | Electric charge regulator (Bontron E 89 supplied from Orient Kagaku Kogyo) | 2 |
| | Plasticizer (Ethyl stearate) | 5 |
| Example 23 | Complex 3C | 2 |
| | Sensitizer (TBABB) | 2 |
| | Electric charge regulator (Bontron E 89 supplied from Orient Kagaku Kogyo) | 2 |
| | Plasticizer (Diethyl terephthalate) | 5 |
| Example 24 | Complex 3A | 2 |
| | TBAPB | 2 |
| | Electric charge regulator (Kayacharge N1 supplied from Nippon Kayaku) | 2 |
| Example 25 | Complex 9 | 2 |
| | TBABB | 2 |
| | Electric charge regulator (Bontron E 89 supplied from Orient Kagaku Kogyo) | 2 |
| Example 26 | Complex 3A | 2 |
| | TBAPB | 2 |
| | Electric charge regulator (Kayacharge N1 supplied from Nippon Kayaku) | 2 |
| Example 27 | Complex 6C | 2 |
| | TMHPB | 2 |
| | Electric charge regulator (Bontron E 89 supplied from Orient Kagaku Kogyo) | 2 |
| Example 28 | Complex 3B | 2 |
| | TBAPB | 2 |
| | Electric charge regulator (Kayacharge N1 supplied from Nippon Kayaku) | 2 |
| Example 29 | Complex 3A | 10 |
| Example 30 | Complex 6C | 10 |
| Example 31 | Complex 3A | 2 |
| | Sensitizer (TBAPB) | 10 |
| Example 32 | Complex 3A | 10 |
| | Sensitizer (TBAPB) | 10 |

TABLE 2-continued

| | Near Infrared-Ray Decolorizable Recording Material (Complex No. in Table 1) and Other Additives | Amount (% by weight) |
|---|---|---|
| Example 33 | Complex 3A | 20 |
| | Sensitizer (TBAPB) | 10 |
| Example 34 | Complex 7C | 10 |
| | Sensitizer (TMAPB) | 10 |
| Example 35 | Complex 9 | 10 |
| | Sensitizer (TBABB) | 10 |
| Example 36 | Complex 3A | 10 |
| | Sensitizer (TBAPB) | 10 |
| | Solvent (Toluene) | 10 |
| Example 37 | Complex 6A | 10 |
| | Sensitizer (TBABB) | 10 |
| | Solvent (Ethylene Glycol Monoethyl ether) | 10 |
| Example 38 | Complex 7A | 10 |
| | Sensitizer (TMHPB) | 10 |
| | Solvent (Polyethylene Glycol) | 10 |
| Example 39 | Complex 3A | 10 |
| | Sensitizer (TBAPB) | 10 |
| | Solvent (Toluene) | 10 |
| | Plasticizer (Dibutyl phthalate) | 5 |
| Example 40 | Complex 7A | 10 |
| | Sensitizer (TBAPB) | 10 |
| | Solvent (Ethylene Glycol Monoethyl ether) | 10 |
| | Plasticizer (Ethyl stearate) | 5 |
| Example 41 | Complex 3A | 10 |
| | Sensitizer (TBABB) | 10 |
| | Solvent (Polyethylene Glycol) | 10 |
| | Plasticizer (Diethyl terephthalate) | 5 |

Note:
TMAPB: Tetramethylammonium n-butyltriphenyl borate
TBAPB: Tetrabutylammonium n-butyltriphenyl borate
TMHPB: Triethylhydrogenammonium n-butyltriphenyl borate
TBABB: Tetrabutylammonium tetra-n-butyl borate

TABLE 3

| Example | Before Irradiation | Hue of Sample After Irradiation of Near infrared rays | After Irradiation of Visible rays |
|---|---|---|---|
| 1 | Blue | Transparent | Not Changed |
| 2 | Blue | Transparent | Not Changed |
| 3 | Blue | Transparent | Not Changed |
| 4 | Blue | Transparent | Not Changed |
| 5 | Purple | Red | Not Changed |
| 6 | Green | Yellow | Not Changed |
| 7 | Blue | White | Not Changed |
| 8 | Blue | White | Not Changed |
| 10 | Blue | Transparent | Not Changed |
| 11 | Blue | Transparent | Not Changed |
| 12 | Blue | Transparent | Not Changed |
| 13 | Blue | Transparent | Not Changed |
| 14 | Blue | Transparent | Not Changed |
| 15 | Blue | Transparent | Not Changed |
| 16 | Blue | Transparent | Not Changed |
| 17 | Blue | Transparent | Not Changed |
| 18 | Blue | Transparent | Not Changed |
| 19 | Blue | Transparent | Not Changed |
| 20 | Blue | Transparent | Not Changed |
| 21 | Blue | Transparent | Not Changed |
| 22 | Blue | Transparent | Not Changed |
| 23 | Blue | Transparent | Not Changed |
| 24 | Blue | Transparent | Not Changed |
| 25 | Blue | Transparent | Not Changed |
| 26 | Blue | White | Not Changed |
| 27 | Blue | White | Not Changed |
| 28 | Blue | White | Not Changed |
| 29 | Blue | Transparent | Not Changed |
| 30 | Blue | Transparent | Not Changed |
| 31 | Blue | Transparent | Not Changed |
| 32 | Blue | Transparent | Not Changed |
| 33 | Blue | Transparent | Not Changed |
| 34 | Blue | Transparent | Not Changed |
| 35 | Blue | Transparent | Not Changed |
| 36 | Blue | Transparent | Not Changed |

TABLE 3-continued

| Example | Before Irradiation | Hue of Sample After Irradiation of Near infrared rays | After Irradiation of Visible rays |
|---|---|---|---|
| 37 | Blue | Transparent | Not Changed |
| 38 | Blue | Transparent | Not Changed |
| 39 | Blue | Transparent | Not Changed |
| 40 | Blue | Transparent | Not Changed |
| 41 | Blue | Transparent | Not Changed |

We claim:

1. A near infrared ray-decolorizable recording material comprising (i) a near infrared ray-absorbing cationic dye-borate anion complex having the formula (I):

wherein $D^+$ represents a cationic dyestuff having absorptions in the near infrared region; $R_1$, $R_2$, $R_3$, and $R_4$ independently represent an alkyl, aryl, alkaryl, allyl, aralkyl, alkenyl, alkynyl, silyl, alicyclic, or saturated or unsaturated heterocyclic group, substituted alkyl, substituted aryl, substituted alkaryl, substituted allyl, substituted aralkyl, substituted alkenyl, substituted alkynyl, or substituted silyl, with the proviso that at least one of $R_1$, $R_2$, $R_3$, and $R_4$ represent an alkyl group having 1 to 8 carbon atoms, and (ii) a sensitizer having the formula (II):

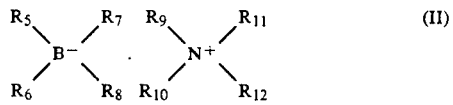

wherein $R_5$, $R_6$, $R_7$, and $R_8$ independently represent an alkyl, aryl, allyl, alkaryl, aralkyl, alkenyl, alkynyl, silyl, alicyclic, or saturated or unsaturated heterocyclic group, substituted alkyl, substituted aryl, substituted alkaryl, substituted allyl, substituted aralkyl, substituted alkenyl, substituted alkynyl, or substituted silyl, with the proviso that at least one of $R_5$, $R_6$, $R_7$, and $R_8$ represent an alkyl group having 1 to 8 carbon atoms; and $R_9$, $R_{10}$, $R_{11}$, and $R_{12}$ independently represent a hydrogen, an alkyl, aryl, alkaryl, allyl, aralkyl, alkenyl, alkynyl, or saturated or unsaturated heterocyclic group, substituted alkyl, substituted aryl, substituted alkaryl, substituted allyl, substituted aralkyl, substituted alkenyl, or substituted alkynyl.

2. A decolorizable toner comprising a near infrared ray-decolorizable recording material according to claim 1 as a colorant, whereby a set portion is decolorized with near infrared rays.

3. A decolorizable ink comprising a near infrared ray-decolorizable recording material according to claim 1 as a colorant, wherein a set portion is decolorized with near infrared rays.

4. A near infrared ray-decolorizable recording material as claimed in claim 1, wherein the sensitizer of formula (II) is present in an amount of 0.01 to 10 parts by weight, based upon 1 part by weight of the cationic dye-borate anion complex of formula (I).

5. A near infrared ray-decolorizable recording material as claimed in claim 1, wherein the sensitizer of formula (II) is present in an amount of 0.1 to 5 parts by weight, based upon 1 part by weight of the cationic dye-borate anion complex of formula (I).

6. A decolorizable toner as claimed in claim 2, wherein the sensitizer of formula (II) is present in an amount of 0.01 to 10 parts by weight, based upon 1 part by weight of the cationic dye-borate anion complex of formula (I).

7. A decolorizable toner as claimed in claim 2, wherein the sensitizer of formula (II) is present in an amount of 0.1 to 5 parts by weight, based upon 1 part by weight of the cationic dye-borate anion complex of formula (I).

8. A decolorizable ink as claimed in claim 3, wherein the sensitizer of formula (II) is present in an amount of 0.01 to 10 parts by weight, based upon 1 part by weight of the cationic dye-borate anion complex of formula (I).

9. A decolorizable ink as claimed in claim 3, wherein the sensitizer of formula (II) is present in an amount of 0.1 to 5 parts by weight based upon 1 weight of the cationic dye-borate anion complex of formula (I).

* * * * *